(12) United States Patent
Schlipf et al.

(10) Patent No.: US 12,312,084 B2
(45) Date of Patent: May 27, 2025

(54) WING FOR AN AIRCRAFT HAVING A FLAP WITH A SPEED BRAKE PANEL MOUNTED IN A ROTATABLE MANNER

(71) Applicant: Airbus Operations GmbH, Hamburg (DE)

(72) Inventors: Bernhard Schlipf, Hamburg (DE); Dort Daandels, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 18/307,295

(22) Filed: Apr. 26, 2023

(65) Prior Publication Data
US 2023/0348041 A1    Nov. 2, 2023

(30) Foreign Application Priority Data
Apr. 29, 2022   (EP) .................................... 22171055

(51) Int. Cl.
*B64C 9/16*   (2006.01)
(52) U.S. Cl.
CPC ...................... *B64C 9/16* (2013.01)
(58) Field of Classification Search
CPC .............. B64C 9/16; B64C 9/323; B64C 9/20
See application file for complete search history.

(56) References Cited

U.S. PATENT DOCUMENTS

| | | | |
|---|---|---|---|
| 3,874,617 A * | 4/1975 | Johnson | B64C 9/16 244/216 |
| 4,015,787 A | 4/1977 | Maieli et al. | |
| 2023/0322357 A1* | 10/2023 | Hubbard | B64C 9/02 |

FOREIGN PATENT DOCUMENTS

| | | |
|---|---|---|
| DE | 723748 C | 8/1942 |
| FR | 1469367 A | 2/1967 |
| GB | 609064 A | 9/1948 |

OTHER PUBLICATIONS

European Search Report for European Patent Application No. 22171055 dated Oct. 10, 2022; priority document.

* cited by examiner

*Primary Examiner* — Brady W Frazier
*Assistant Examiner* — Shanna Danielle Glover
(74) *Attorney, Agent, or Firm* — Greer, Burns & Crain, Ltd.

(57) ABSTRACT

A wing for an aircraft has a main wing and a trailing edge high lift assembly which has a flap and a connection assembly movably mounting the flap to the main wing. The connection assembly has a first actuator unit for moving the flap between the retracted position and at least one extended position. The flap has a leading edge part and a trailing edge part pivotably mounted to the leading edge. The flap has a second actuator unit for moving the trailing edge part relative to the leading edge part within an operating range between an upper operating position and a lower operating position.

10 Claims, 9 Drawing Sheets

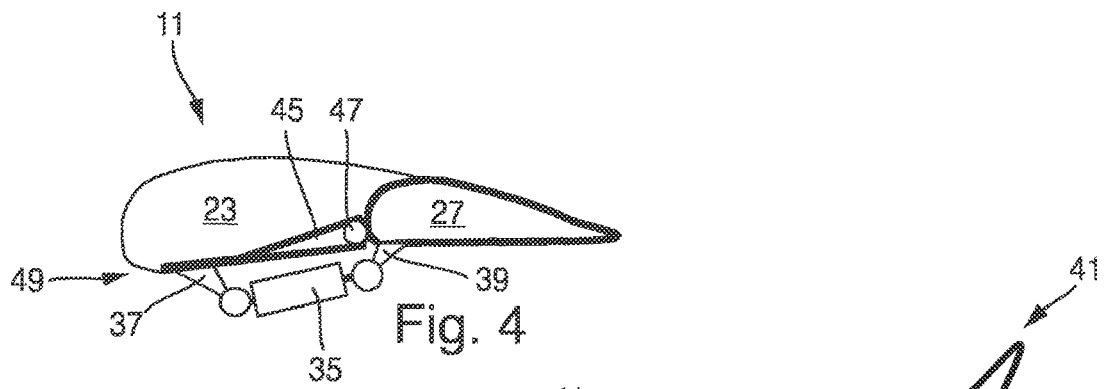
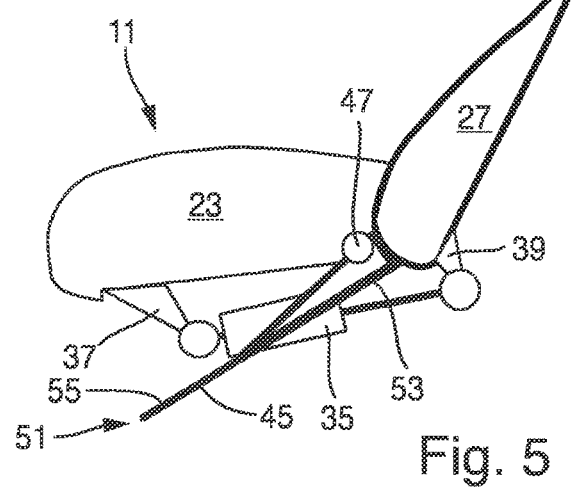
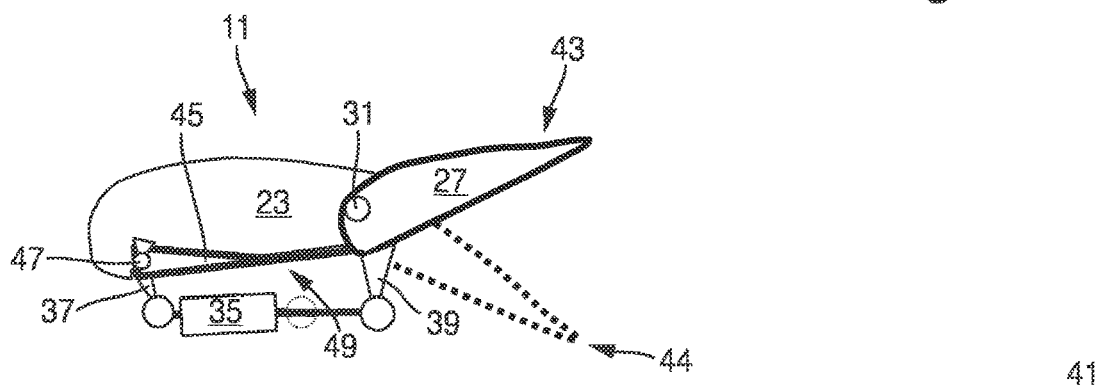
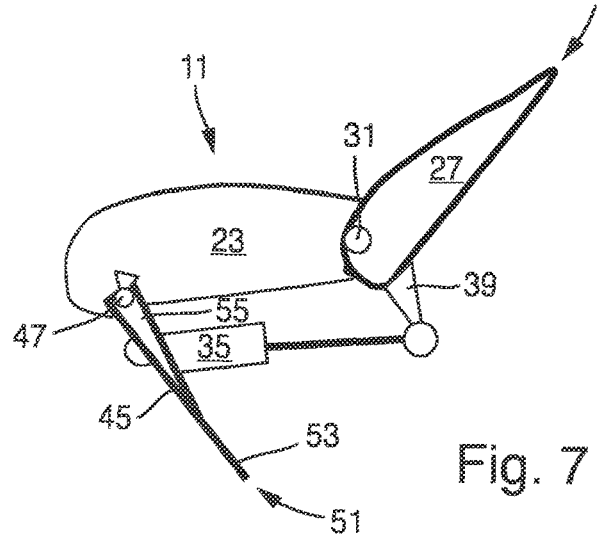

WING FOR AN AIRCRAFT HAVING A FLAP WITH A SPEED BRAKE PANEL MOUNTED IN A ROTATABLE MANNER

CROSS-REFERENCES TO RELATED APPLICATIONS

This application claims the benefit of the European patent application No. 22171055.1 filed on Apr. 29, 2022, the entire disclosures of which are incorporated herein by way of reference.

FIELD OF THE INVENTION

The present invention relates to a wing for an aircraft. Further aspects of the invention relate to a trailing edge high lift assembly for such a wing, and to an aircraft comprising such a wing and/or comprising such a trailing edge high lift assembly.

BACKGROUND OF THE INVENTION

The wing comprises a main wing and a trailing edge high lift assembly. The trailing edge high lift assembly is movably arranged at a trailing edge of the main wing and comprises a flap and a connection assembly. The connection assembly movably mounts the flap to the main wing, such that the flap is movable relative to the main wing between a retracted position with a reduced chord length and/or curvature of the wing, and at least one extended position with an extended chord length and/or curvature of the wing. The connection assembly comprises a first actuator unit, e.g., including a rotary motor or a linear motor, for moving the flap between the retracted position and the at least one extended position.

The flap comprises a leading edge part, in particular a main flap part, comprising the leading edge of the flap, and a trailing edge part, in particular a tab, comprising the trailing edge of the flap and mounted to the leading edge part, in particular to the trailing edge of the leading edge part, in a manner pivotable about a pivot axis preferably extending in a span direction. The flap further comprises a second actuator unit, e.g., including a rotary motor or a linear motor, preferably coupled between the leading edge part and the trailing edge part, for moving the trailing edge part relative to the leading edge part within an operating range between an upper operating position and a lower operating position. In particular, the operating range being the range within which the trailing edge part is moved relative to the leading edge part for normal flight control operation of the flap during flight of the respective aircraft, e.g., +/−25° from a normal cruise flight position.

Similar wings are known in the art. Some known wings comprise a trailing edge high lift assembly having a flap that is movable relative to the main wing in a rotational manner, e.g., by the flap being fixedly mounted on a lever that is rotatably mounted to the trailing edge of the main wing and that is driven by a drive strut mounted to a rotating drive arm. Other known wings have a trailing edge high lift assembly with a flap that is movable relative to the main wing in a combined linear and rotational manner, e.g., by the flap being rotatably mounted on a carriage running along a linear guide rail while the flap is driven by a drive strut mounted to a rotating drive arm, so that the flap carries out a coupled linear and rotational motion. Such trailing edge high lift assemblies are designed to be deployed during take-off and landing of an aircraft to increase lift and reduce minimum air speed by increasing wing area, curvature, and angle of attack, and to be retracted during cruise flight when air speed is high to reduce drag.

More recent investigations have shown that it might be advantageous to have a morphing wing that might adjust wing area, curvature, and angle of attack during the entire flight, e.g., as a "real-time" response to gust or to optimise lift, drag and structural loading during the flight. This can be achieved by the two-part flap comprising leading edge part and trailing edge part which can be moved relative to one another as required.

As a speed brake to decelerate the aircraft after landing, known wings regularly employ a spoiler arranged on the upper side of the wing upstream of the trailing edge flap that can be pivoted into the ambient flow immediately after touchdown of the aircraft to reduce lift and increase drag. However, such spoilers require separate actuation and control systems.

SUMMARY OF THE INVENTION

The object of the invention is to provide a wing having a trailing edge high lift assembly with a simplified speed brake concept.

This object is achieved in that the flap is configured to be brought into a speed brake setting where the trailing edge part is moved, preferably by the second actuator unit, relative to the leading edge part beyond the upper operating position or beyond the lower operating position to a speed brake position where the trailing edge part is angled relative to the leading edge part to cause turbulence and drag, preferably steeply angled relative to the leading edge part, preferably by more than 25°, further preferred by more than 35°, most preferred more than 45°, from a neutral position. In such a way, the speed brake function is integrated into the flap, so that a separate spoiler is not required anymore and can be omitted, thereby largely simplifying the wing and reducing its costs.

According to a preferred embodiment, the connection assembly is configured such that the flap is movable relative to the main wing in a rotational manner, i.e., in a pivoting manner. Preferably, the flap is mounted to the main wing in a manner rotatable about a flap rotation axis. Preferably, the flap rotation axis is located outside the profile of the flap, preferably spaced apart from the flap, e.g., by a flap lever arm. The flap lever arm is preferably mounted to the main wing via a rib that projects downwards from the lower side of the main wing and that is mounted to the lever arm rotatably via the flap rotation axis. Such a rotationally mounted flap relates to a very simple and reliable connection assembly and trailing edge high lift assembly design.

According to a further preferred embodiment, the second actuator unit is formed as a linear actuator, such as a hydraulic, pneumatic, or electromagnetic linear motor, that is mounted, preferably rotatably mounted, to the leading edge part and that is mounted, preferably rotatably mounted, to the trailing edge part in a position spaced apart from the pivot axis, preferably at all pivot positions of the trailing edge part relative to the leading edge part, i.e., the direction of movement of the second actuator unit does not intersect the pivot axis at all pivot positions of the trailing edge part. This might be realized by the second actuator unit being mounted to the leading edge part via a leading edge lever extending away from the leading edge part, and/or being mounted to the trailing edge part via a trailing edge lever extending away from the trailing edge part. Such a second actuator unit in the form of a linear actuator is particularly simple and efficient. However, the second actuator unit might also be formed as a rotary actuator, e.g., positioned at the pivot axis.

According to a further preferred embodiment, the flap comprises a speed brake panel mounted to the leading edge part or to the trailing edge part in a manner rotatable about a panel axis between a stowed position, where it is preferably flush with and/or rests against the upper or lower side of the leading edge part, and a deployed position, where it extends away from the leading edge part into the ambient flow, preferably steeply angled relative to the leading edge part, preferably by an angle of between 30° and 90°, further preferred between 45° and 80°, most preferred between 60° and 70°, relative to the outer mold line of the leading edge part in the area of the panel axis. Preferably, the panel axis is parallel to the pivot axis and/or flap rotation axis. By such a speed brake panel the speed brake function of the flap can be largely improved.

In particular, it is preferred that the flap is configured and/or controlled such that the speed brake panel is in the stowed position when the trailing edge part is operated within the operating range, and such that the speed brake panel is in the deployed position when the trailing edge part is in the speed brake position. In such a way, for the speed brake function of the flap both the trailing edge part in the speed brake position and the speed brake panel in the deployed position can be employed at the same time, thereby largely increasing efficiency and effectivity of the speed brake function.

It is also preferred that the speed brake panel and the trailing edge part extend in opposite directions or in partly opposite directions when the speed brake panel is in the deployed position and the trailing edge part is in the speed brake position. Preferably, the speed brake panel extends in a downwards direction and the trailing edge part extends in an upwards direction, but might also be vice-versa. In such a way, the speed brake panel and the trailing edge part spread apart from opposite sides of the flap, thereby increasing drag and braking the aircraft.

According to a preferred embodiment, the flap comprises a third actuator unit, preferably a linear actuator such as a hydraulic, pneumatic, or electromagnetic linear motor, or a rotary actuator, for moving the speed brake panel, preferably directly or via a linkage, between the stowed position and the deployed position, i.e., to the stowed position and/or to the deployed position. By such a third actuator unit, the speed brake panel can be moved independently from the second actuator unit.

If the third actuator unit directly moves the speed brake panel, the third actuator unit in the form of a linear actuator might be rotatably mounted to the leading edge part with its one end and might be rotatably mounted to the speed brake panel with its opposite end spaced apart from the panel axis. If the third actuator unit moves the speed brake panel via a linkage, the linkage might preferably include a rocker link, e.g., having an L-form, and a further link. The third actuator unit in the form of a linear actuator is coupled to a first end of the rocker link. The rocker link is mounted to the leading edge part in a rocking or swinging manner, and is coupled with its second end rotatably to the further link, that in turn is mounted rotatably to the speed brake panel at a position spaced apart from the panel axis. In such a way, simple and efficient actuation concepts are formed, with or without using a linkage.

According to an alternative embodiment, the flap comprises an actuation mechanism, such as a linkage, a catch, a cam, a spring, and/or a gear, for moving the speed brake panel between the stowed position and the deployed position, i.e., to the stowed position and/or to the deployed position, by transferring movement of the trailing edge part relative to the leading edge part or of the second actuator unit to the speed brake panel. By such an actuation mechanism, the speed brake panel can be moved without requiring a third actuator unit merely by utilizing movement of the second actuator unit or trailing edge part.

In a preferred embodiment, the actuation mechanism might be formed as a linkage. Preferably, the linkage includes a first linear link, a rocker link, e.g., having an L-form, and a second linear link. The first linear link might be rotatable mounted to the trailing edge part at one end and might be rotatably mounted to a first end of the rocker link. The rocker link might be mounted to the leading edge part in a rocking or swinging manner and might be mounted to the speed brake panel via the second linear link that is rotatably mounted to the second end of the rocker link with its one end and rotatably mounted to the speed brake panel with its opposite end spaced part from the panel axis. In such a way, a simple and efficient actuation mechanism is formed.

In another preferred embodiment the actuation mechanism comprises a different linkage and further comprises a retraction spring. Preferably, the linkage comprises a first link and a second link rotatably mounted to one another, wherein the first link might be rotatably mounted to the trailing edge part and the second link might be rotatably mounted to the speed brake panel. The first and second links are preferably folded or pivoted together when the trailing edge part is in the neutral position and begin spreading apart when the trailing edge part is moved towards the upper operating position, and is maximum spread apart when the trailing edge part has reached the upper operating position, so that upon further movement of the trailing edge part beyond the upper operating position the speed brake panel is moved towards the deployed position. The retraction spring preferably is a linear spring mounted to the leading edge part with its one end and mounted to the speed brake panel with its opposite end. The retraction spring is biased to retract the speed brake panel back into the stowed position. In such a way, a further simple and efficient actuation mechanism is formed.

In a further preferred embodiment, the actuation mechanism comprises a catch mechanism for moving the speed brake panel from the stowed position to the deployed position. The catch mechanism preferably comprises a catch arm or projection fixedly mounted to the trailing edge part and a catch surface provided at the speed brake panel. The catch mechanism may be configured such that the catch arm contacts the catch surface, when the trailing edge part is moved beyond the upper operating position, and pushes the speed brake panel to the deployed position upon further movement of the trailing edge part to the speed brake position. The retraction spring is preferably configured to retract the speed brake panel back into the stowed position, when the trailing edge part has been moved back into the operating range. In this embodiment as well as in other embodiments, actuation mechanism and speed brake panel might be configured such that dynamic pressure of the ambient flow during flight is utilized to fully deploy the speed brake panel after having been partly deployed by the actuation mechanism. In such a way, a further simple and efficient actuation mechanism is formed.

In a further preferred embodiment, the actuation mechanism comprises a cam mechanism for moving the speed brake panel from the stowed position to the deployed position. The cam mechanism preferably comprises a cam mounted to the speed brake panel and a cam track provided in the trailing edge part and configured to be engaged by the cam, preferably such that the trailing edge part when moving to the speed brake position moves the speed brake panel to a partly deployed position, while the dynamic pressure of the ambient flow preferably pushes the speed brake panel to the deployed position allowed by the cam moving along the cam track. Preferably, the retraction spring is configured to retract the speed brake panel back into the stowed position, when the trailing edge part has been moved back into the operating range. In such a way, a further simple and efficient actuation mechanism is formed.

In a further preferred embodiment, the actuation mechanism comprises a different cam mechanism comprising a cam mounted to the trailing edge part and a cam track provided in the leading edge part, configured to be engaged by the cam, and preferably opening to the back of the speed brake panel in the stowed position, such that when the trailing edge part is moved to the speed brake position, the cam preferably pushes the speed brake panel from the stowed position towards the deployed position. Preferably, the retraction spring is configured to retract the speed brake panel back into the stowed position, when the trailing edge part has been moved back into the operating range. In addition, or as an alternative to the retraction spring, the speed brake panel might also be sucked to the stowed position by a low pressure supply that might be formed, e.g., as a pressure channel connecting the upper and lower surface of the leading edge part. In such a way, a further simple and efficient actuation mechanism is formed.

According to a preferred embodiment, the panel axis is located at the leading edge end of the speed brake panel, so that the speed brake panel preferably rotates in a forward direction when deployed, i.e., opens to the rear. In such a way, the speed brake panel can be deployed against and stowed with the force of the ambient flow. This relates to a very simple and efficient speed brake concept.

In particular, it is preferred that the speed brake panel is mounted to the leading edge part, preferably to the leading edge portion of the leading edge part. In such a way, the speed brake panel is arranged upstream from the trailing edge part, so that the two speed brake elements, i.e., the speed brake panel and the trailing edge part, are staggered along the chord extension of the flap.

According to an alternative embodiment, the panel axis is located at the trailing edge end of the speed brake panel, so that the speed brake panel preferably rotates in a rearward direction when deployed, i.e., opens to the front. In such a way, the speed brake panel can be deployed with and stowed against the force of the ambient flow. This relates to a very simple and efficient speed brake concept.

In particular, it is preferred that the speed brake panel is mounted to the leading edge part, preferably to the trailing edge portion of the leading edge part. In such a way, the speed brake panel can be moved together with or arranged in extension with the trailing edge part when moved to the speed brake position.

Alternatively, it is preferred that the speed brake panel is mounted to the trailing edge part, preferably to the leading edge portion of the trailing edge part. In such a way, the speed brake panel can be moved together with or arranged in extension with the trailing edge part when moved to the speed brake position.

A further aspect of the present invention relates to a trailing edge high lift assembly for the wing and/or as used in the wing according to any of the embodiments explained above. In particular, the trailing edge high lift assembly comprises a flap and a connection assembly for movably mounting the flap to the main wing, such that the flap is movable between a retracted position and at least one extended position. The connection assembly comprises a first actuator unit for moving the flap between the retracted position and the at least one extended position. The flap comprises a leading edge part and a trailing edge part mounted to the leading edge part in a manner pivotable about a pivot axis. The flap comprises a second actuator unit for moving the trailing edge part relative to the leading edge part within an operating range between an upper operating position and a lower operating position. The flap is configured to be brought into a speed brake position where the trailing edge part is moved relative to the leading edge part beyond the upper operating position or beyond the lower operating position to a speed brake position. The features and effects explained above in connection with the wing apply vis-à-vis also to the trailing edge high lift assembly.

A further aspect of the present invention relates to an aircraft comprising the wing according to any of the embodiments explained above, and/or comprising the trailing edge high lift assembly according to any of the embodiments explained above. The features and effects explained above in connection with the wing and the trailing edge high lift assembly apply vis-à-vis also to the aircraft.

BRIEF DESCRIPTION OF THE DRAWINGS

Hereinafter, preferred embodiments of the present invention are described in more detail by means of a drawing. The drawing shows in.

DETAILED DESCRIPTION OF THE PREFERRED EMBODIMENTS

Figure 1:
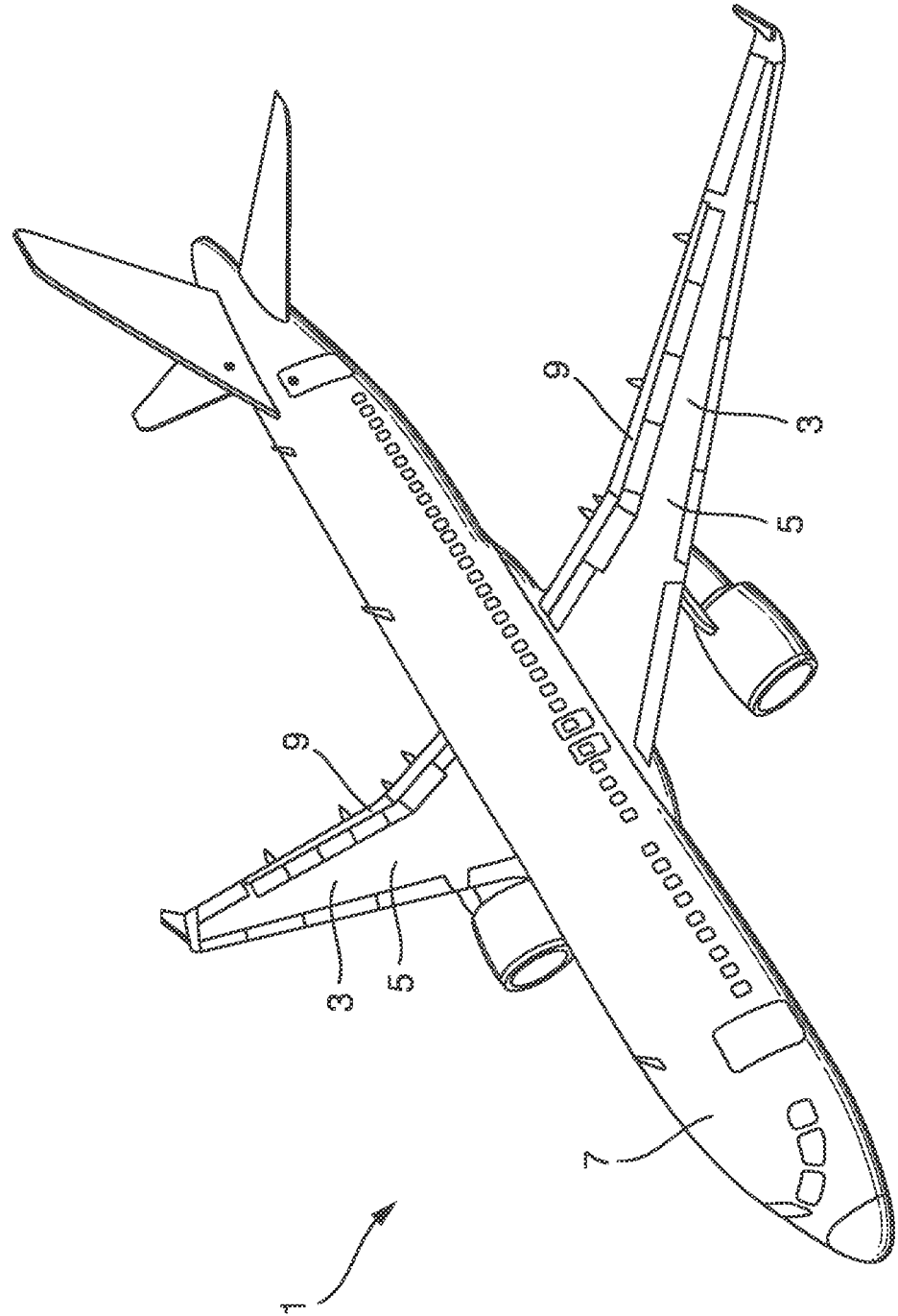
FIG. 1 a perspective view of an aircraft according to an embodiment of the invention, FIG. 2 a schematic cross sectional view across the span direction of a wing according to a first embodiment of the invention with a focus on the trailing edge high lift assembly including the flap, FIG. 3 a schematic cross sectional view of the wing shown in FIG. 2 with the trailing edge part of the flap in the speed brake position and the speed brake panel in the deployed position, FIG. 4 a schematic cross sectional view of a flap of a wing according to a second embodiment of the invention, FIG. 5 a schematic cross sectional view of the wing shown in FIG. 4 with the trailing edge part of the flap in the speed brake position and the speed brake panel in the deployed position, FIG. 6 a schematic cross sectional view of a flap of a wing according to a third embodiment of the invention, FIG. 7 a schematic cross sectional view of the wing shown in FIG. 6 with the trailing edge part of the flap in the speed brake position and the speed brake panel in the deployed position, FIG. 8 a schematic cross sectional view of a flap of a wing according to a fourth embodiment of the invention, FIG. 9 a schematic cross sectional view of a flap of a wing according to a fifth embodiment of the invention, FIG. 10 a schematic cross sectional view of a flap of a wing according to a sixth embodiment of the invention, FIG. 11 a schematic cross sectional view of the wing shown in FIG. 10 with the trailing edge part of the flap in the upper operating position and the speed brake panel in the stowed position, FIG. 12 a schematic cross sectional view of the wing shown in FIG. 10 with the trailing edge part of the flap in the speed brake position and the speed brake panel in the deployed position, FIG. 13 a schematic cross sectional view of a flap of a wing according to a seventh embodiment of the invention, FIG. 14 a schematic cross sectional view of the wing shown in FIG. 13 with the trailing edge part of the flap in the speed brake position and the speed brake panel in the deployed position, FIG. 15 a schematic cross sectional view of a flap of a wing according to an eighth embodiment of the invention, FIG. 16 a schematic cross sectional view of the wing shown in FIG. 15 with the trailing edge part of the flap in the upper operating position and the speed brake panel in the stowed position, FIG. 17 a schematic cross sectional view of the wing shown in FIG. 15 with the trailing edge part of the flap in the speed brake position and the speed brake panel in the deployed position, FIG. 18 a schematic cross sectional view of a flap of a wing according to a ninth embodiment of the invention, FIG. 19 a schematic cross sectional view of the wing shown in FIG. 18 with the trailing edge part of the flap in the upper operating position and the speed brake panel in a partly deployed position, FIG. 20 a schematic cross sectional view of the wing shown in FIG. 18 with the trailing edge part of the flap in the speed brake position and the speed brake panel in the deployed position, FIG. 21 a schematic cross sectional view of a flap of a wing according to a tenth embodiment of the invention, with the trailing edge part of the flap in the speed brake position and the speed brake panel in a partly deployed position, FIG. 22 a schematic cross sectional view of the wing shown in FIG. 21 with the trailing edge part of the flap in the speed brake position and the speed brake panel in the deployed position, and FIG. 23 a schematic cross sectional view of a flap of a wing according to an eleventh embodiment of the invention.

FIG. 1 shows an exemplary aircraft 1 according to an embodiment of the present invention. The aircraft 1 comprises a wing 3 including a main wing 5 mounted to a fuselage 7, and a trailing edge high lift assembly 9 including a flap 11 movably mounted to the main wing 5.

FIGS. 2 to 23 illustrate eleven embodiments of the wing 3 of the aircraft 1 shown in FIG. 1 and the associated flap 11, respectively. The wing 3 according to the first embodiment shown in FIGS. 2 and 3 comprises a main wing 5 and a trailing edge high lift assembly 9. The trailing edge high lift assembly 9 is movably arranged at a trailing edge of the main wing 5 and comprises a flap 11 and a connection assembly 13. The connection assembly 13 movably mounts the flap 11 to the main wing 5, such that the flap 11 is movable between a retracted position 15 with a reduced chord length and curvature of the wing 3, and at least one extended position 17 with an extended chord length and curvature of the wing 3. The flap 11 is mounted to the main wing 5 in a manner rotatable about a flap rotation axis 19, wherein the flap rotation axis 19 is located outside the flap profile spaced apart from the flap 11 by a flap lever arm 20. The flap lever arm 21 is mounted to the main wing 5 via a rib 23 that projects downwards from the lower side of the main wing 5 and that is mounted to the lever arm 20 rotatably via the flap rotation axis 19.

The connection assembly 13 comprises a first actuator unit 21 for moving the flap 11 between the retracted position 15 and the at least one extended position 17. The first actuator unit 21 is formed as a linear motor rotatably coupled between the flap lever arm 20 and the rib 22 spaced apart from the flap rotation axis 19, i.e., rotatably coupled to the flap lever arm 20 at one end and rotatably coupled to the rib 22 at the opposite end of the first actuator unit 21, as visible in FIG. 2.

The flap 11 comprises a leading edge part 23 including the leading edge 25 of the flap 11, and a trailing edge part 27 including the trailing edge 29 of the flap 11 and mounted to the leading edge part 23 in a manner pivotable about a pivot axis 31 extending in a span direction 33. The flap 11 further comprises a second actuator unit 35 in the form of a linear motor coupled between the leading edge part 23 and the trailing edge part 27 for moving the trailing edge part 27 relative to the leading edge part 23 within an operating range between an upper operating position 43 and a lower operating position 44. The operating range relates to the range within which the trailing edge part 27 is moved relative to the leading edge part 23 for normal flight control operation of the flap 11 during flight of the respective aircraft, e.g., +/−25° from a neutral position, which is the normal cruise flight position. The second actuator unit 35 is rotatably mounted to the leading edge part 23 via a leading edge lever 37 extending away from the leading edge part 23, and is rotatably mounted to the trailing edge part 27 via a trailing edge lever 39 extending away from the trailing edge part 27, so that the second actuator unit 35 is mounted between the leading edge part 23 and the trailing edge part 27 in a position spaced apart from the pivot axis 31 at all pivot positions of the trailing edge part 27 relative to the leading edge part 23.

Figure 3:
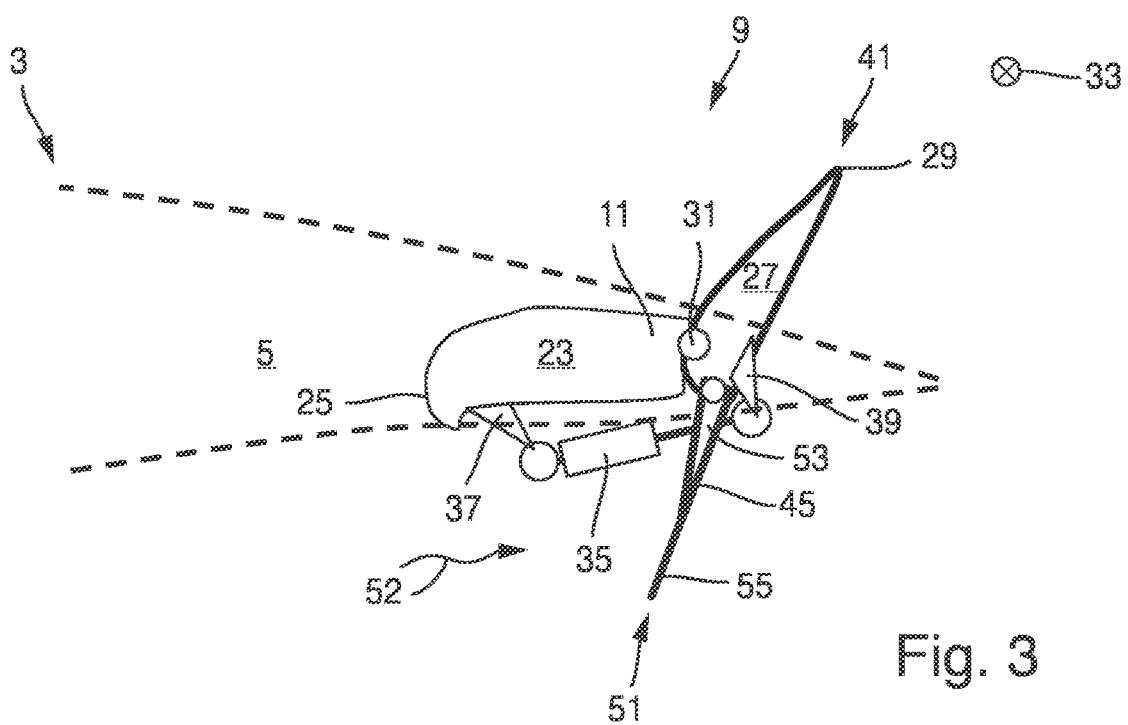

As shown in FIG. 3, the flap 11 is configured to be brought into a speed brake setting where the trailing edge part 27 is moved by the second actuator unit 35 relative to the leading edge part 23 beyond the upper operating position 43 to a speed brake position 41 where the trailing edge part 27 is steeply angled relative to the leading edge part 23 to cause turbulence and drag, in the present embodiment angled by more than 45° from the neutral position.

Figure 2:
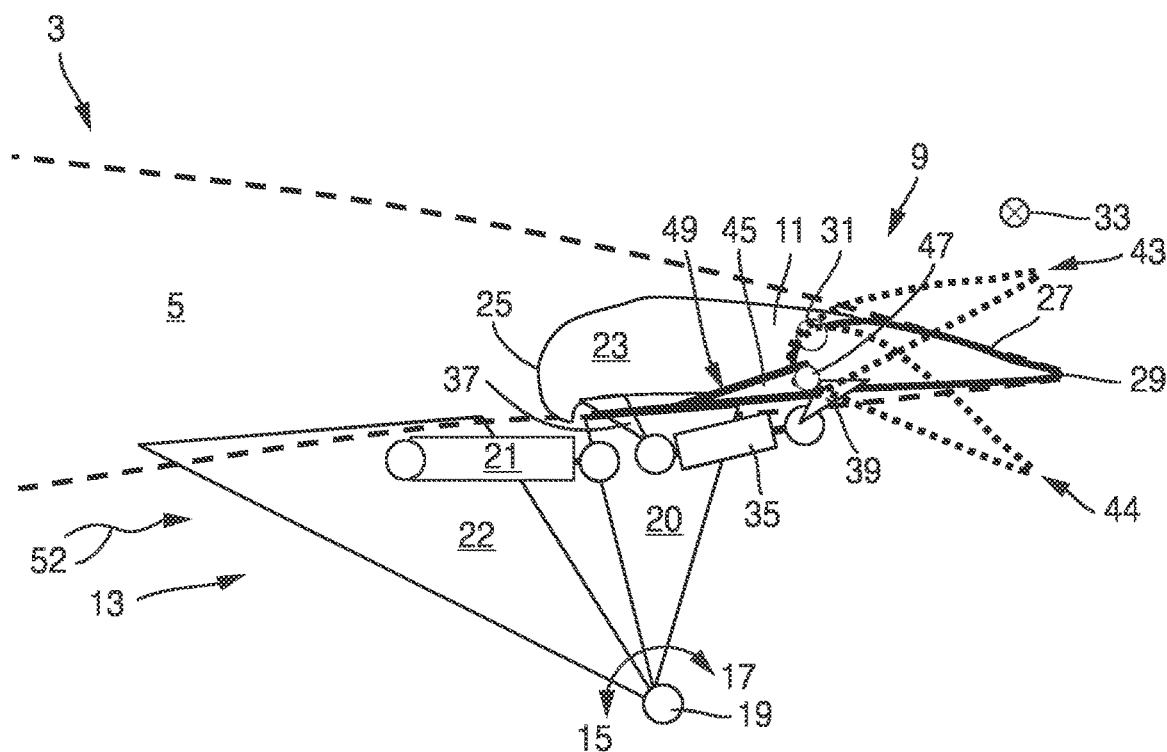

As also shown in FIGS. 2 and 3, the flap 11 comprises a speed brake panel 45 mounted to the trailing edge part 27 in a manner rotatable about a panel axis 47 between a stowed position 49, where it is flush with and/or rests against the lower side of the leading edge part 23, and a deployed position 51, where it extends away from the leading edge part 23 into the ambient flow 52, steeply angled relative to the leading edge part 23 by an angle of more than 45°. In the present embodiment, the panel axis 47 is parallel to the pivot axis 31 and to the flap rotation axis 19. The flap 11 is configured and controlled such that the speed brake panel 45 is in the stowed position 49 when the trailing edge part 27 is operated within the operating range, and such that the speed brake panel 45 is in the deployed position 51 when the trailing edge part 27 is in the speed brake position 41. In such a way, for the speed brake function of the flap 11 both the trailing edge part 27 in the speed brake position 41 and the speed brake panel 45 in the deployed position 51 can be employed at the same time, thereby largely increasing efficiency and effectivity of the speed brake function.

As shown in FIG. 3, the speed brake panel 45 and the trailing edge part 27 extend in opposite directions or in partly opposite directions, when the speed brake panel 45 is in the deployed position 51 and the trailing edge part 27 is in the speed brake position 41. In the present embodiment, the speed brake panel 45 extends in a downwards direction and the trailing edge part 27 extends in an upwards direction.

In the present embodiment shown in FIGS. 2 and 3, the panel axis 47 is located at the trailing edge end 53 of the speed brake panel 45, so that the speed brake panel 45 rotates in a rearward direction when deployed, i.e., opens to the front. Further, the speed brake panel 45 is mounted to the leading edge portion of the trailing edge part 27.

The second embodiment shown in FIGS. 4 and 5 differs from the first embodiment shown in FIGS. 2 and 3 in that the speed brake panel 45 is mounted to the trailing edge portion of the leading edge part 23.

The third embodiment shown in FIGS. 6 and 7 differs from the first embodiment shown in FIGS. 2 and 3 in that the panel axis 47 is located at the leading edge end 55 of the speed brake panel 45, so that the speed brake panel 45 rotates in a forward direction when deployed, i.e., opens to the rear. Further, the speed brake panel 45 is mounted to the leading edge portion of the leading edge part 23.

Although not visible in FIGS. 2 to 7, the speed brake panel 45 can be moved either by a third actuator unit or by an actuation mechanism transferring movement from the trailing edge part 27 or from the second actuator unit 35 to the speed brake panel 45. Various options for such third actuators and actuation mechanisms are possible, as will be explained hereinafter.

Figure 8:
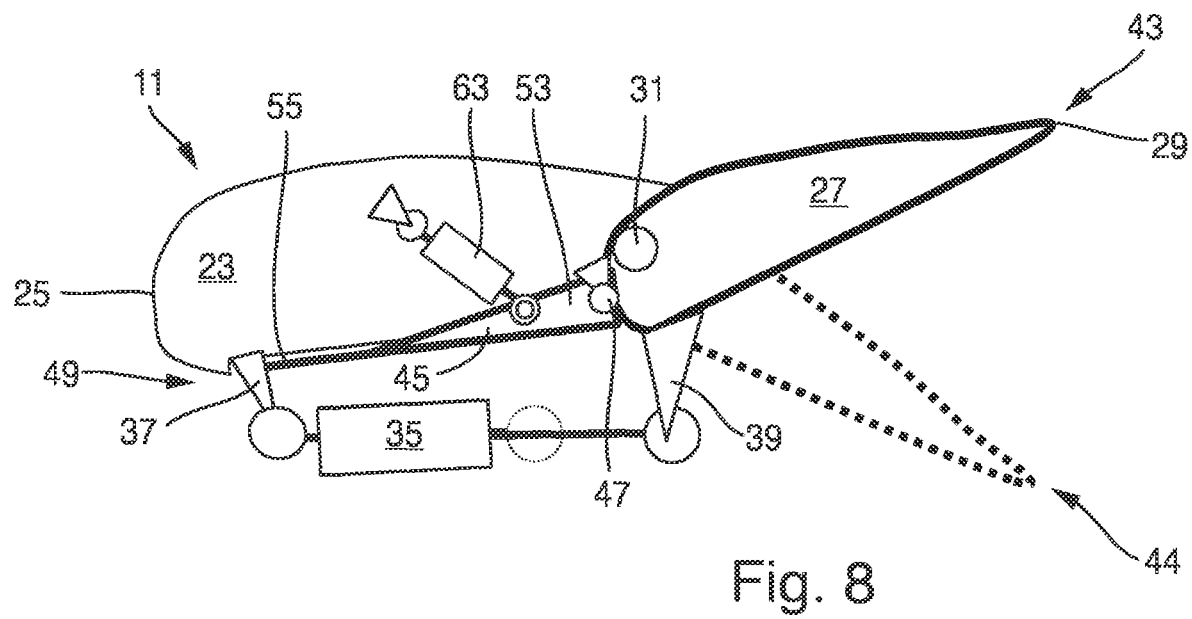

The fourth embodiment shown in FIG. 8 differs from the second embodiment shown in FIGS. 4 and 5 in that the flap 11 comprises a third actuator unit 63, in the present embodiment a linear actuator, such as a hydraulic, pneumatic, or electromagnetic linear motor, for moving the speed brake panel 45 between the stowed position 49 and the deployed position 51. The third actuator unit 63 is rotatably mounted to the leading edge part 23 with its one end and it rotatably mounted to the speed brake panel 45 with its opposite end.

Figure 9:
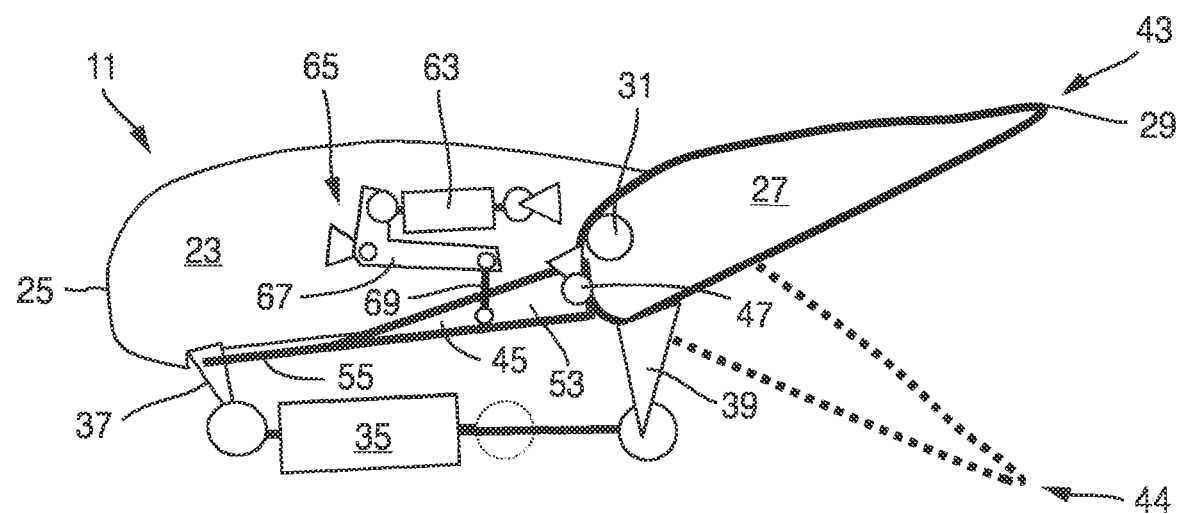

The fifth embodiment shown in FIG. 9 differs from the fourth embodiment shown in FIG. 8 in that the speed brake panel 45 is moved by the third actuator 63 unit via a linkage 65. The linkage 65 in the present embodiment includes a rocker link 67, in this embodiment having an L-form, and a further link 69. The third actuator unit 63 in the form of a linear actuator instead of being coupled directly to the speed brake panel 45, is coupled to a first end of the rocker link 67. The rocker link 67 is mounted to the leading edge part 23 in a rocking or swinging manner, and is coupled with its second end rotatably to the further link 69, that in turn is mounted rotatably to the speed brake panel 45 at a position spaced apart from the panel axis 47.

Figure 10:
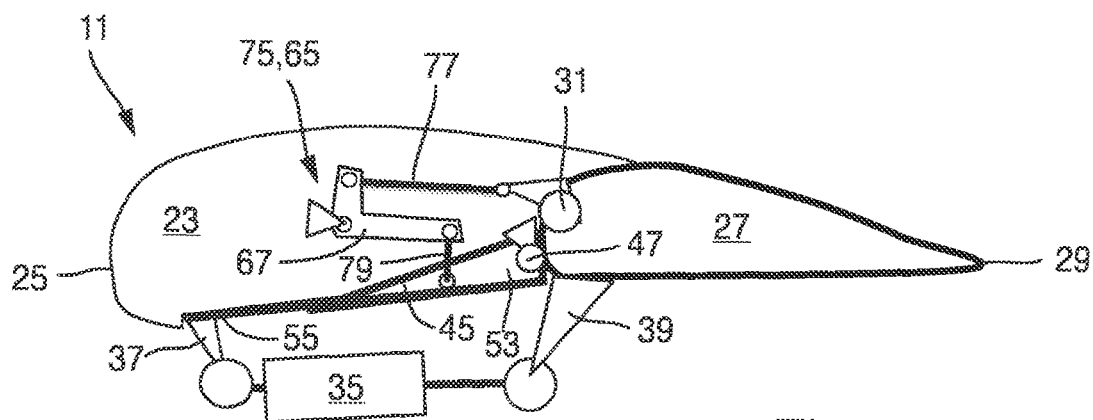
Figure 11:
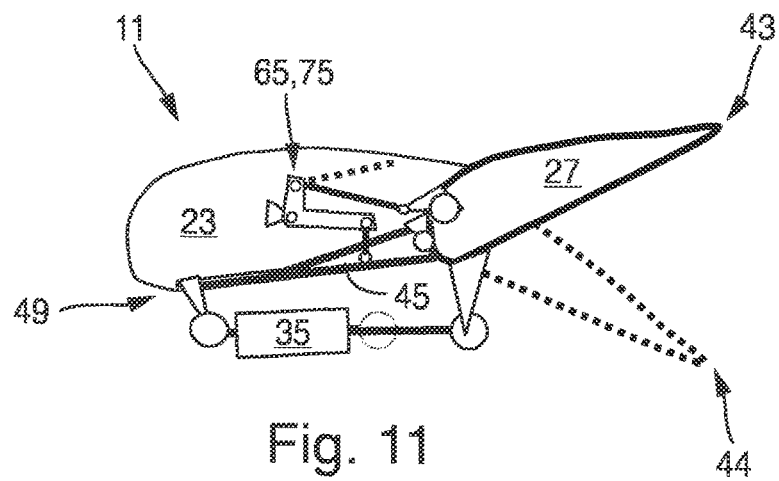
Figure 12:
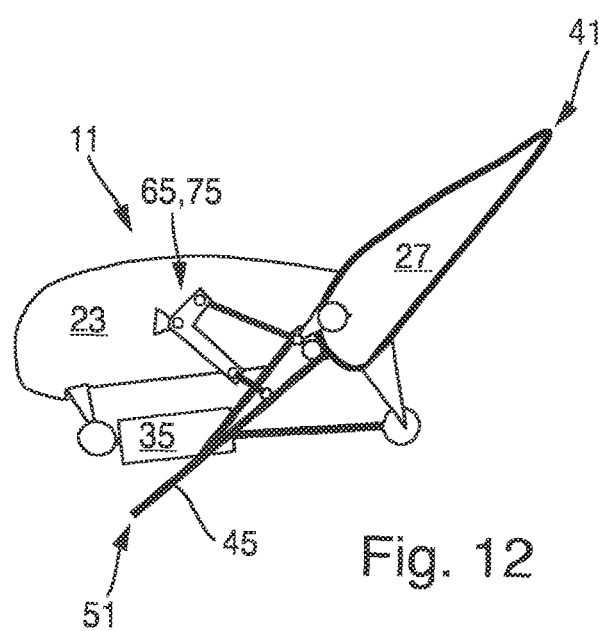

The sixth embodiment shown in FIGS. 10 to 12 differs from the fourth and fifth embodiments shown in FIGS. 8 and 9 in that instead of comprising a third actuator unit 63 for moving the speed brake panel 45, the flap 11 comprises an actuation mechanism 75 for moving the speed brake panel 45 between the stowed position 49 and the deployed position 51 by transferring movement of the trailing edge part 27 relative to the leading edge part 23 or of the second actuator unit 35 to the speed brake panel 45. In the present embodiment, the actuation mechanism 75 is formed as a linkage 65. In this embodiment, the linkage 65 includes a first linear link 77, a rocker link 67, presently having an L-form, and a second linear link 79. The first linear link 77 is rotatable mounted to the trailing edge part 27 at one end and is rotatably mounted to a first end of the rocker link 67. The rocker link 67 is mounted to the leading edge part 23 in a rocking or swinging manner and is mounted to the speed brake panel 45 via the second linear link 79 that is rotatably mounted to the second end of the rocker link 67 with its one end and rotatably mounted to the speed brake panel 45 with its opposite end spaced part from the panel axis 47.

Figure 13:
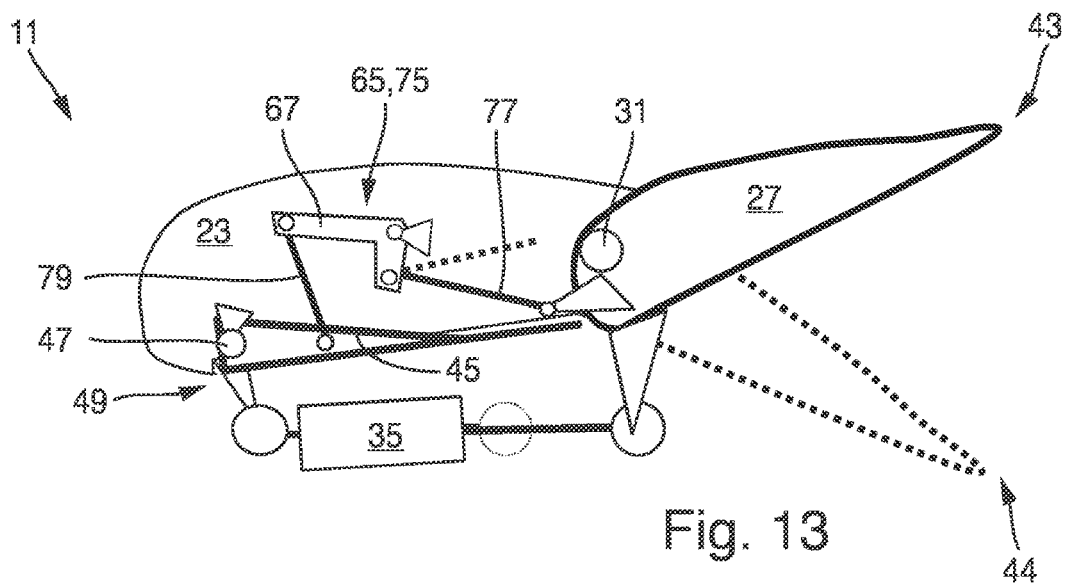
Figure 14:
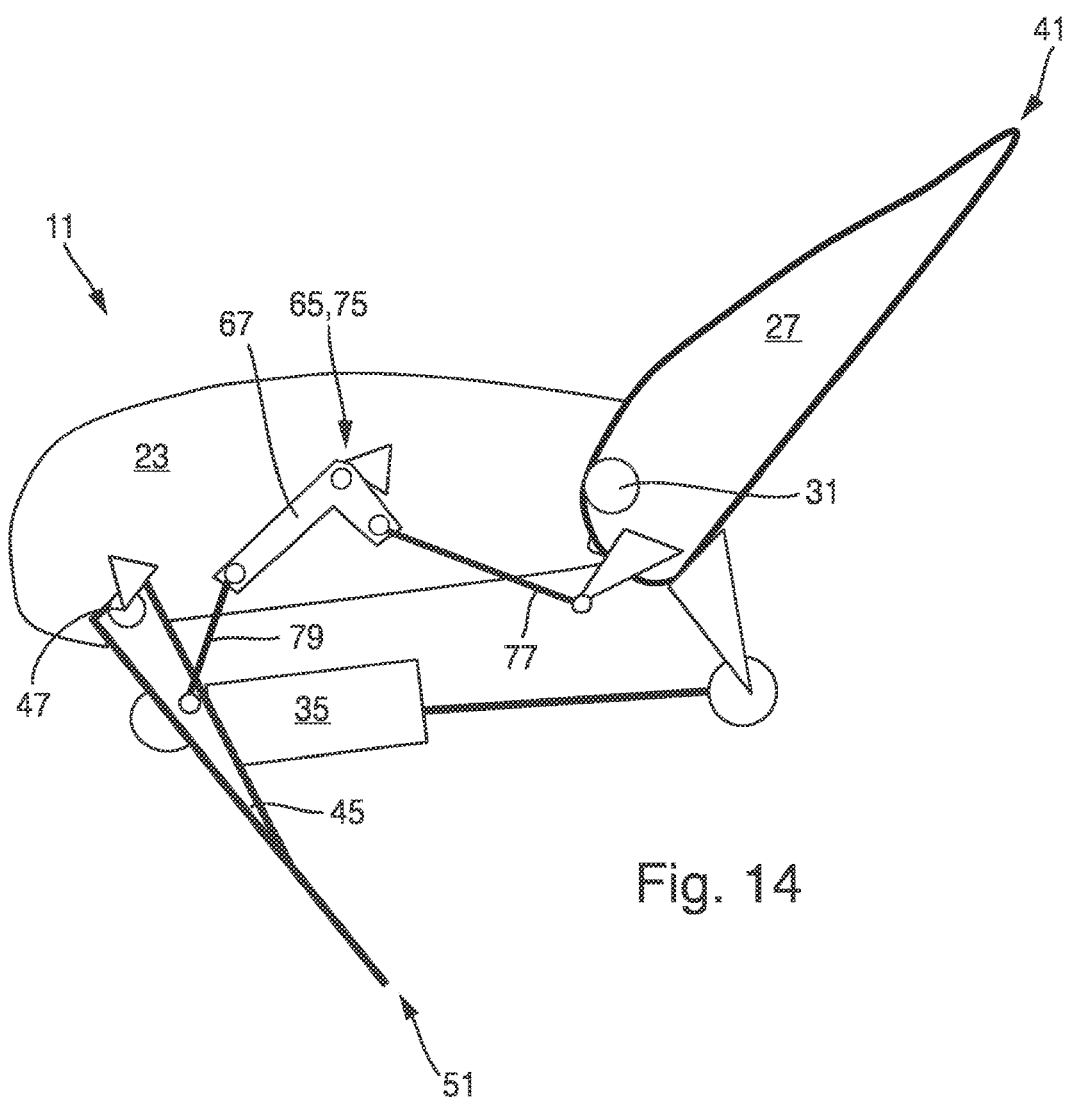

The seventh embodiment shown in FIGS. 13 and 14 differs from the sixth embodiment shown in FIGS. 10 to 12 only in that the panel axis 47 is located at the leading edge end 55 of the speed brake panel 45, and in that the speed brake panel 45 is mounted to the leading edge portion of the leading edge part 23.

Figure 15:
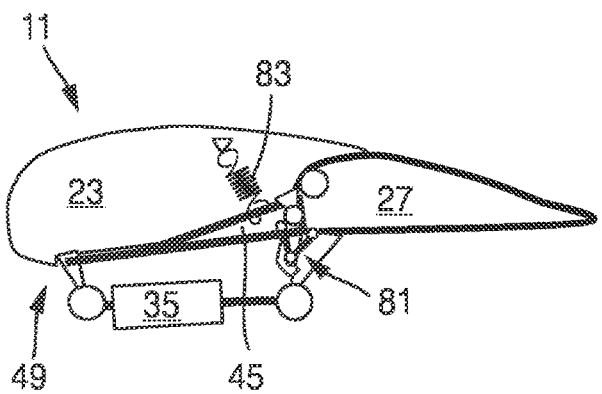
Figure 16:
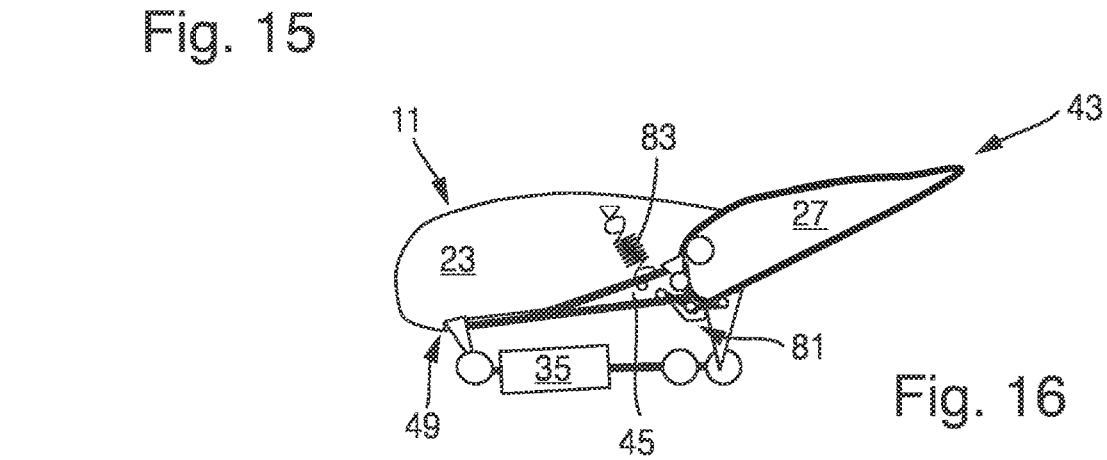
Figure 17:
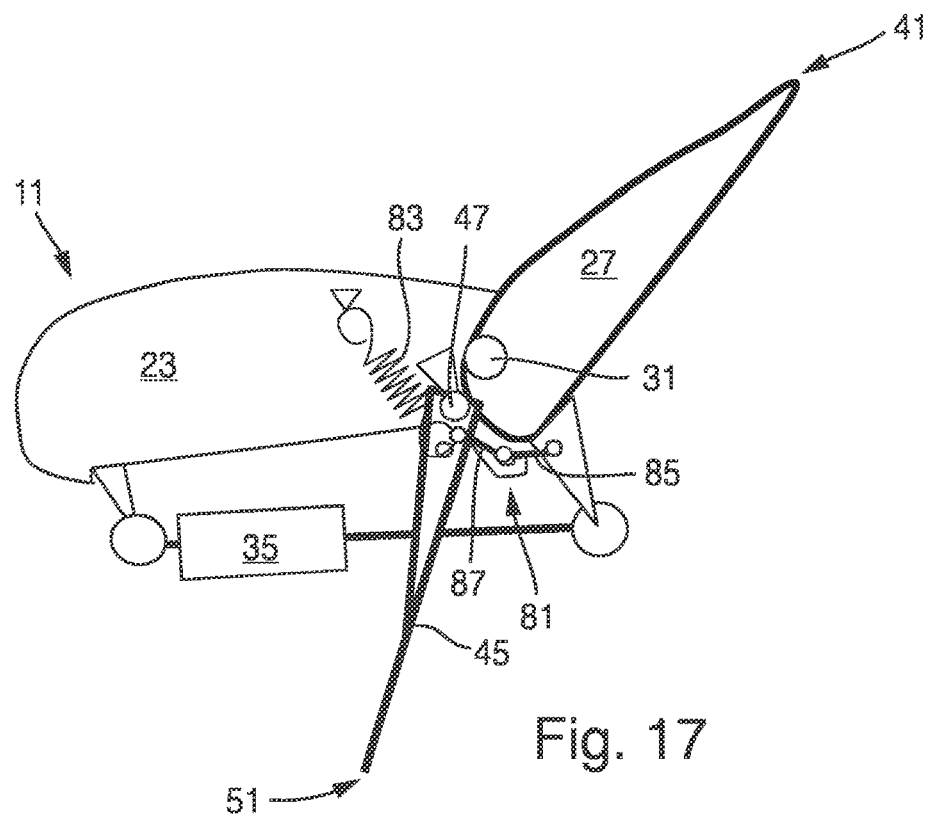

The eighth embodiment shown in FIGS. 15 to 17 differs from the second embodiment shown in FIGS. 4 and 5 in that the actuation mechanism 75 comprises a different linkage 81 and further comprises a retraction spring 83. The linkage 81 comprises a first link 85 and a second link 87 rotatably mounted to one another, wherein the first link 85 is rotatably mounted to the trailing edge part 27 and the second link 87 is rotatably mounted to the speed brake panel 45. The first and second links 85, 87 are folded together when the trailing edge part 27 is in the neutral position and begins spreading apart when the trailing edge part 27 is moved towards the upper operating position 43, and is maximum spread apart when the trailing edge part 27 has reached the upper operating position 43, so that upon further movement of the trailing edge part 27 beyond the upper operating position 43 the speed brake panel 45 is moved towards the deployed position 51. The retraction spring 83 in the present embodiment is a linear spring mounted to the leading edge part 27 with its one end and mounted to the speed brake panel 45 with its opposite end. The retraction spring 83 is biased to retract the speed brake panel 45 back into the stowed position 49.

Figure 18:
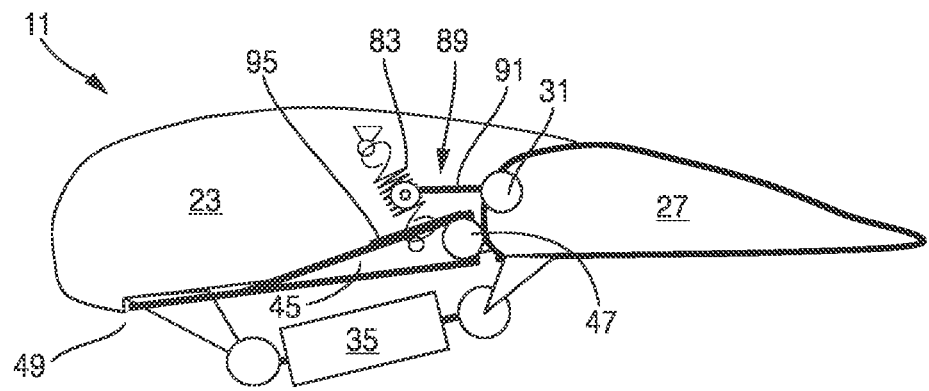
Figure 19:
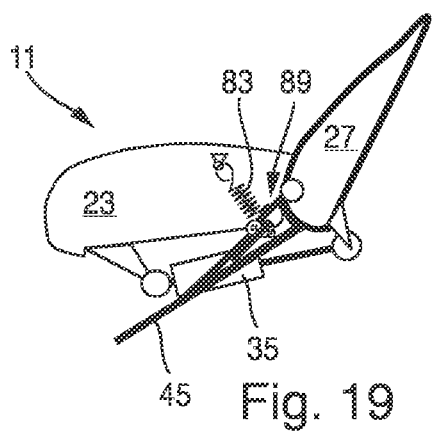
Figure 20:
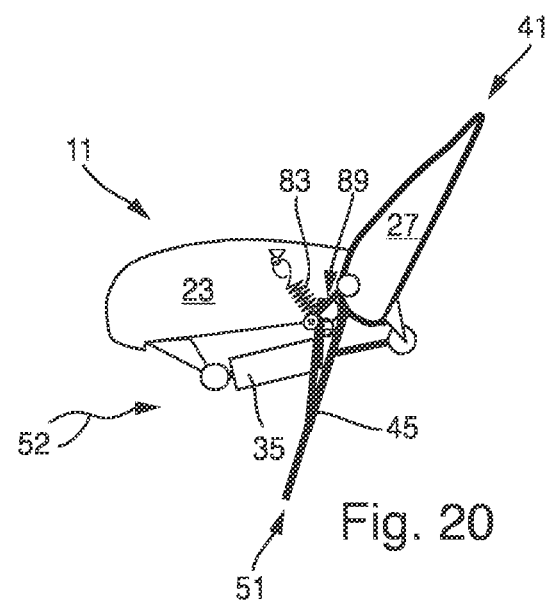

The ninth embodiment shown in FIGS. 18 to 20 differs from the eighth embodiment shown in FIGS. 15 to 17 in that the actuation mechanism 75 instead of a linkage 65 comprises a catch mechanism 89 for moving the speed brake panel 45 from the stowed position 49 to the deployed position 51. The catch mechanism 89 comprises a catch arm 91 or projection fixedly mounted to the trailing edge part 27 and a catch surface 95 provided at the speed brake panel 45. The catch mechanism 89 is configured such that the catch arm 91 contacts the catch surface 95 when the trailing edge part 27 is moved beyond the upper operating position 43 and pushes the speed brake panel 45 to the deployed position 51 upon further movement of the trailing edge part 27 to the speed brake position 41. The retraction spring 83 is configured to retract the speed brake panel 45 back into the stowed position 49, when the trailing edge part 27 has been moved back into the operating range. The actuation mechanism 75 and speed brake panel 45 might be configured such that dynamic pressure of the ambient flow 52 during flight is utilized to fully deploy the speed brake panel 45 after having been partly deployed by the actuation mechanism 75.

Figure 21:
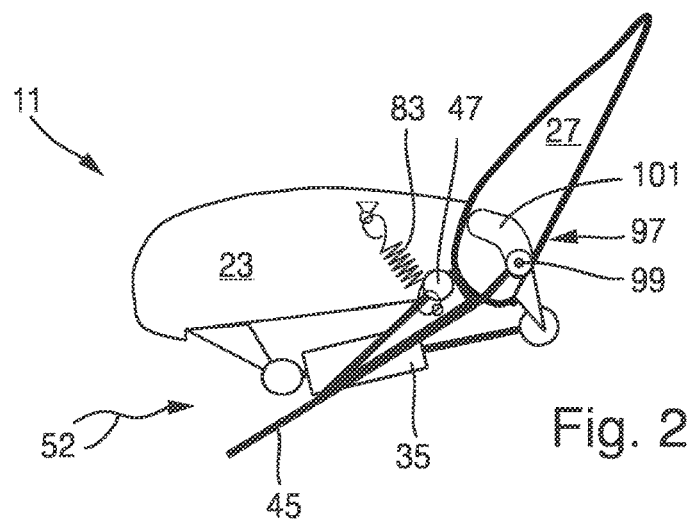
Figure 22:
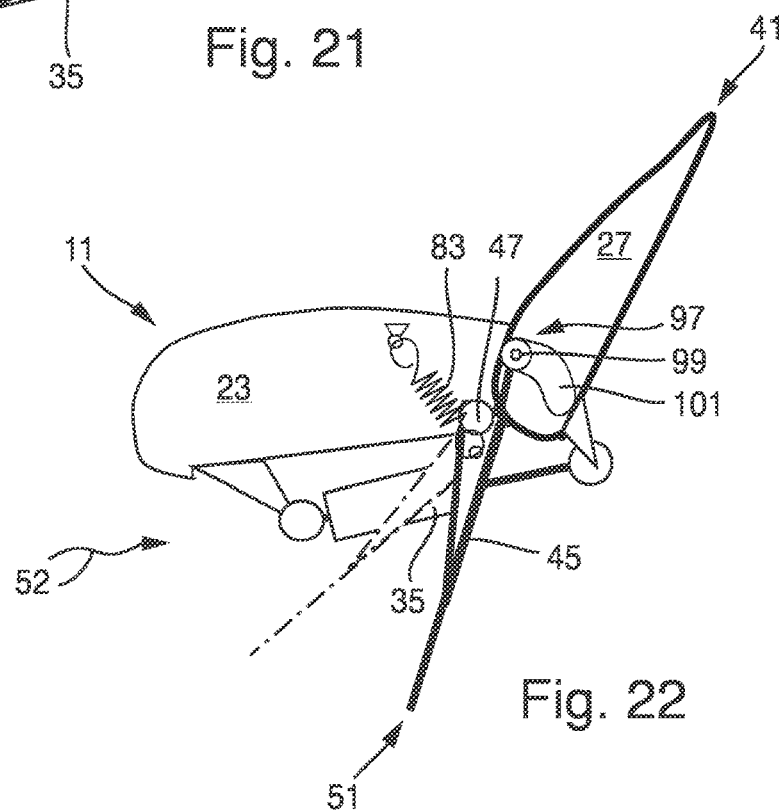

The tenth embodiment shown in FIGS. 21 and 22 differs from the ninth embodiment shown in FIGS. 18 to 20 in that the actuation mechanism 75 instead of a catch mechanism 89 comprises a cam mechanism 97 for moving the speed brake panel 45 from the stowed position 49 to the deployed position 51. The cam mechanism 97 comprises a cam 99 mounted to the speed brake panel 45 and a cam track 101 provided in the trailing edge part 27 and configured to be engaged by the cam 99, such that the trailing edge part 27 when moving to the speed brake position 41 moves the speed brake panel 45 to a partly deployed position 51, while the dynamic pressure of the ambient flow 52 pushes the speed brake panel 45 to the deployed position 51 allowed by the cam 99 moving along the cam track 101. The retraction spring 83 is configured to retract the speed brake panel 45 back into the stowed position 49, when the trailing edge part 27 has been moved back into the operating range.

Figure 23:
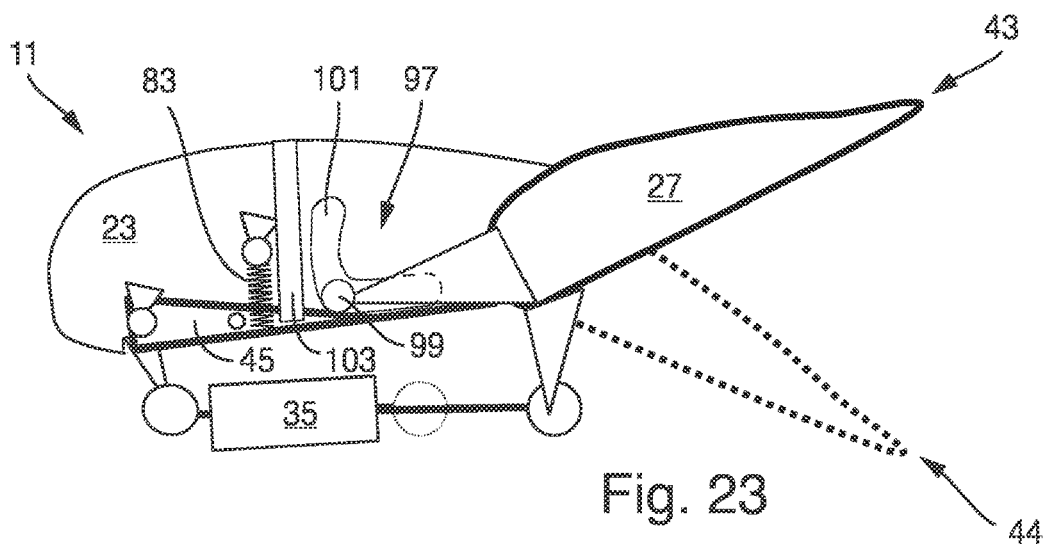

The eleventh embodiment shown in FIG. 23 differs from the tenth embodiment shown in FIGS. 21 and 22 in that the panel axis 47 is located at the leading edge end 55 of the speed brake panel 45, in that the speed brake panel 45 is mounted to the leading edge portion of the leading edge part 23, and in that the cam mechanism 97 comprises a cam 99 mounted to the trailing edge part 27 and a cam track 101 provided in the leading edge part 23, configured to be engaged by the cam 99, and opening to the back of the speed brake panel 45, such that when the trailing edge part 27 is moved to the speed brake position 41, the cam 99 pushes the speed brake panel 45 from the stowed position 49 towards the deployed position 51. The retraction spring 83 is configured to retract the speed brake panel 45 back into the stowed position 49, when the trailing edge part 27 has been moved back into the operating range. In addition, or as an alternative to the retraction spring 83, the speed brake panel 45 might also be sucked to the stowed position 49 by a low pressure supply 103 that might be formed, e.g., as a pressure channel connecting the upper and lower surface of the leading edge part 23.

By the trailing edge high lift assembly 9 according to the invention, the speed brake function is integrated into the flap 11, so that a separate spoiler is not required anymore and can be omitted, thereby largely simplifying the wing 3 and reducing its costs.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft comprising:
   a main wing; and
   a trailing edge high lift assembly movably arranged at a trailing edge of the main wing, the trailing edge high lift assembly comprising:
   a flap; and
   a connection assembly movably mounting the flap to the main wing, such that the flap is movable between a retracted position and at least one extended position,
   wherein the connection assembly comprises a first actuator unit for moving the flap between the retracted position and the at least one extended position,
   wherein the flap comprises a leading edge part and a trailing edge part mounted to the leading edge part in a manner pivotable about a pivot axis,
   wherein the flap comprises a second actuator unit for moving the trailing edge part relative to the leading edge part within an operating range between an upper operating position and a lower operating position,
   wherein the flap is configured to be brought into a speed brake setting where the trailing edge part is moved relative to the leading edge part beyond the upper operating position or beyond the lower operating position to a speed brake position,
   wherein the flap comprises a speed brake panel mounted to the leading edge part or to the trailing edge part in a manner rotatable about a panel axis between a stowed position and a deployed position,
   wherein the panel axis is located at a trailing edge end of the speed brake panel.

2. The wing according to claim 1, wherein the connection assembly is configured such that the flap is movable relative to the main wing in a rotational manner.

3. The wing according to claim 2, wherein the second actuator unit is formed as a linear actuator that is mounted to the leading edge part and mounted to the trailing edge part in a position spaced apart from the pivot axis.

4. The wing according to claim 1, wherein the flap is configured such that the speed brake panel is in the stowed position when the trailing edge part is operated within the operating range, and such that the speed brake panel is in the deployed position when the trailing edge part is in the speed brake position.

5. The wing according to claim 4, wherein the speed brake panel and the trailing edge part extend in opposite directions or in partly opposite directions when the speed brake panel is in the deployed position and the trailing edge part is in the speed brake position.

6. The wing according to claim 5, wherein the flap comprises an actuation mechanism for moving the speed brake panel between the stowed position and the deployed position by transferring movement of the trailing edge part or of the second actuator unit to the speed brake panel.

7. A wing for an aircraft comprising:
   a main wing; and
   a trailing edge high lift assembly movably arranged at a trailing edge of the main wing, the trailing edge high lift assembly comprising:
   a flap; and
   a connection assembly movably mounting the flap to the main wing, such that the flap is movable between a retracted position and at least one extended position,
   wherein the connection assembly comprises a first actuator unit for moving the flap between the retracted position and the at least one extended position,
   wherein the flap comprises a leading edge part and a trailing edge part mounted to the leading edge part in a manner pivotable about a pivot axis,
   wherein the flap comprises a second actuator unit for moving the trailing edge part relative to the leading edge part within an operating range between an upper operating position and a lower operating position,
   wherein the flap is configured to be brought into a speed brake setting where the trailing edge part is moved relative to the leading edge part beyond the upper operating position or beyond the lower operating position to a speed brake position,
   wherein the connection assembly is configured such that the flap is movable relative to the main wing in a rotational manner,
   wherein the second actuator unit is formed as a linear actuator that is mounted to the leading edge part and mounted to the trailing edge part in a position spaced apart from the pivot axis,
   wherein the flap comprises a speed brake panel mounted to the leading edge part or to the trailing edge part in a manner rotatable about a panel axis between a stowed position and a deployed position,
   wherein the flap is configured such that the speed brake panel is in the stowed position when the trailing edge part is operated within the operating range, and such that the speed brake panel is in the deployed position when the trailing edge part is in the speed brake position, wherein the speed brake panel and the trailing edge part extend in opposite directions or in partly opposite directions when the speed brake panel is in the deployed position and the trailing edge part is in the speed brake position, wherein the flap comprises an actuation mechanism for moving the speed brake panel between the stowed position and the deployed position by transferring movement of the trailing edge part or of the second actuator unit to the speed brake panel, wherein the panel axis is located at a trailing edge end of the speed brake panel.

8. The wing according to claim 7, wherein the speed brake panel is mounted to the leading edge part.

9. The wing according to claim 7, wherein the speed brake panel is mounted to the trailing edge part.

10. An aircraft comprising the wing and the trailing edge high lift assembly according to claim 1.

* * * * *